US011714479B2

(12) United States Patent
Takeda

(10) Patent No.: US 11,714,479 B2
(45) **Date of Patent: *Aug. 1, 2023**

(54) SENSING APPARATUS AND SENSING SYSTEM

(71) Applicant: SEIKO EPSON CORPORATION, Tokyo (JP)

(72) Inventor: Kazuyoshi Takeda, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/352,764

(22) Filed: Jun. 21, 2021

(65) Prior Publication Data

US 2021/0397243 A1 Dec. 23, 2021

(30) Foreign Application Priority Data

Jun. 22, 2020 (JP) ................................ 2020-106859

(51) Int. Cl.
*G06F 1/3296* (2019.01)
*G05B 15/02* (2006.01)
*H02J 9/00* (2006.01)

(52) U.S. Cl.
CPC ........... *G06F 1/3296* (2013.01); *G05B 15/02* (2013.01); *H02J 9/005* (2013.01)

(58) Field of Classification Search
CPC .................................................... G06F 1/3296
See application file for complete search history.

(56) References Cited

U.S. PATENT DOCUMENTS 8,941,530 B2 * 1/2015 Choi ................ H04N 21/42222 345/158
2003/0093189 A1 5/2003 Honda
2004/0143382 A1 7/2004 Ishida
2009/0106572 A1 4/2009 Taguchi et al.
2015/0256062 A1 9/2015 Shirahata et al.
2017/0171645 A1 * 6/2017 Kupermann .......... G06F 1/3287
2018/0173272 A1 * 6/2018 Satou ...................... G06F 13/38
2020/0175852 A1 * 6/2020 Yamashita .............. H04L 67/52
(Continued)

FOREIGN PATENT DOCUMENTS

CN 107490998 A 12/2017
DE 10 2016 218 161 3/2017
JP 2003-084871 3/2003
(Continued)

*Primary Examiner* — Suresh Suryawanshi
(74) *Attorney, Agent, or Firm* — Rankin, Hill & Clark LLP

(57) ABSTRACT

A sensing apparatus includes a sensor, a processing circuit that acquires sensor output information from the sensor, a communication circuit that receives communication start time information, a power supply circuit that supplies the processing circuit with power supply voltage based on battery voltage from a battery, and a clocking circuit that operates by using the battery voltage and generates time information. The power supply circuit is activated by an instruction from the clocking circuit. The processing circuit starts acquiring the sensor output information after the power supply voltage is supplied from the power supply circuit. The communication circuit starts transmitting the transmission information at communication start time specified by the communication start time information.

9 Claims, 11 Drawing Sheets

(56) References Cited

U.S. PATENT DOCUMENTS

| | | | | |
|---|---|---|---|---|
| 2020/0272516 | A1* | 8/2020 | Katayama | G06F 9/4818 |

FOREIGN PATENT DOCUMENTS

| | | | |
|---|---|---|---|
| JP | 2003-139874 | 5/2003 | |
| JP | 2004-226166 | 8/2004 | |
| JP | 2009-116851 | 5/2009 | |
| JP | 2017-061166 | 3/2017 | |
| WO | 2014/064762 | 5/2014 | |
| WO | 2015/019394 | 2/2015 | |
| WO | WO-2016043126 A1 * | 3/2016 | G08C 15/06 |
| WO | WO-2019056399 A1 * | 3/2019 | G01D 21/00 |

* cited by examiner

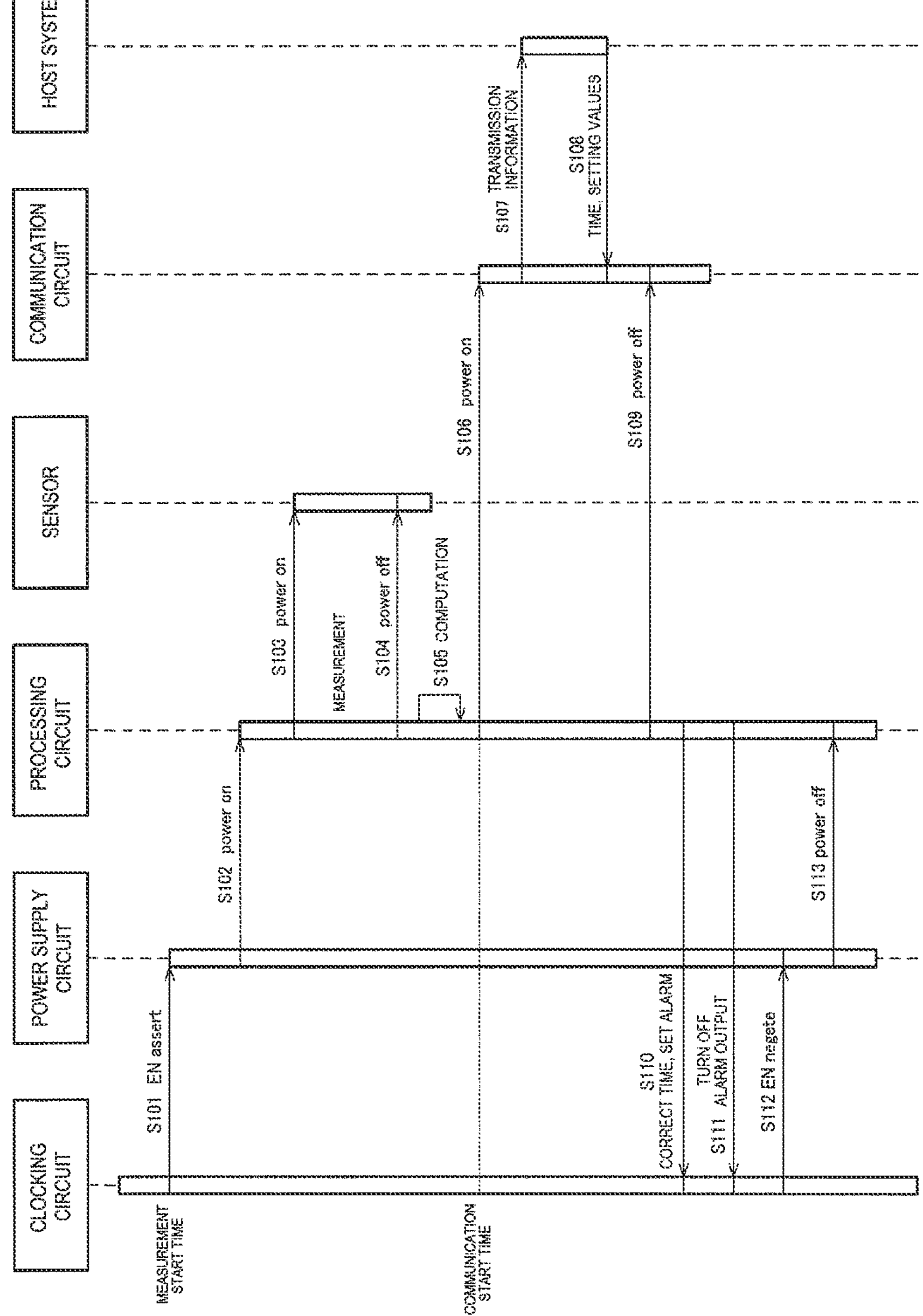
FIG. 4
CLOCKING CIRCUIT
POWER SUPPLY CIRCUIT
PROCESSING CIRCUIT
SENSOR
COMMUNICATION CIRCUIT
HOST SYSTEM
S101 EN assert
S102 power on
S103 power on
MEASUREMENT
S104 power off
S105 COMPUTATION
S106 power on
S107 TRANSMISSION INFORMATION
S108 TIME, SETTING VALUES
S109 power off
S110 CORRECT TIME, SET ALARM
S111 TURN OFF ALARM OUTPUT
S112 EN negate
S113 power off
MEASUREMENT START TIME
COMMUNICATION START TIME

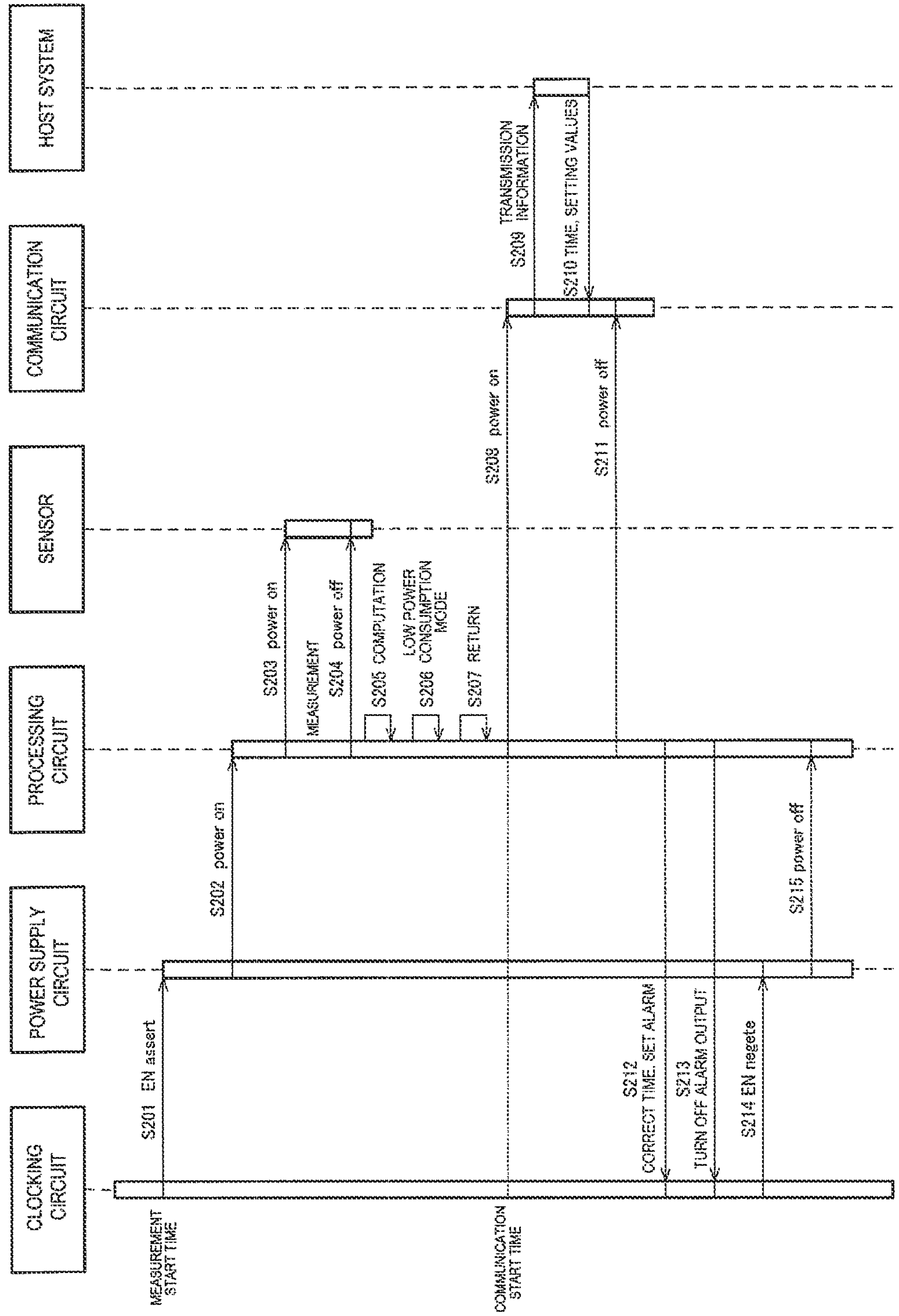
FIG. 5
HOST SYSTEM
COMMUNICATION CIRCUIT
SENSOR
PROCESSING CIRCUIT
POWER SUPPLY CIRCUIT
CLOCKING CIRCUIT
MEASUREMENT START TIME
COMMUNICATION START TIME
S201 EN assert
S202 power on
S203 power on
MEASUREMENT
S204 power off
S205 COMPUTATION
S206 LOW POWER CONSUMPTION MODE
S207 RETURN
S208 power on
S209 TRANSMISSION INFORMATION
S210 TIME, SETTING VALUES
S211 power off
S212 CORRECT TIME. SET ALARM
S213 TURN OFF ALARM OUTPUT
S214 EN negete
S215 power off

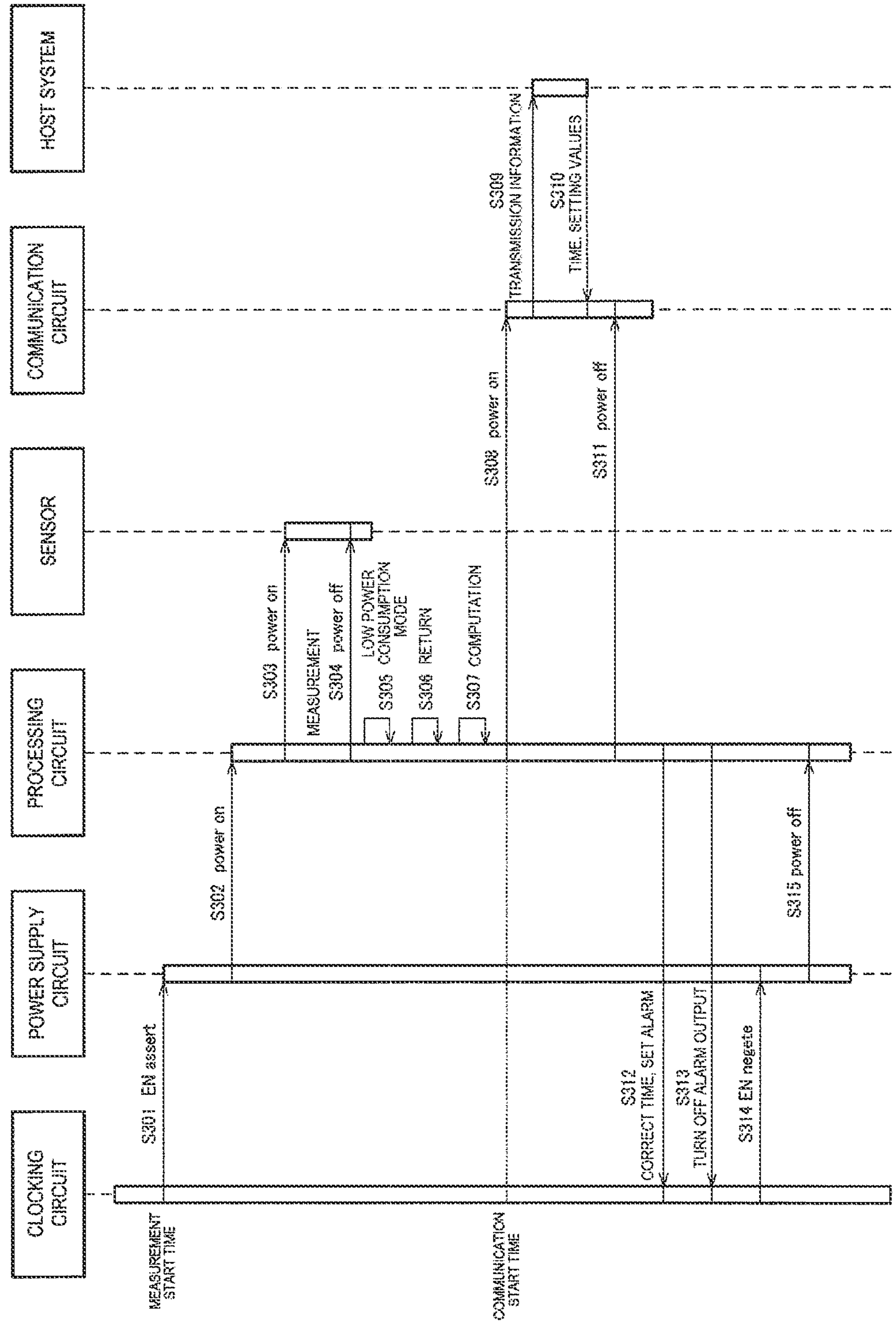

FIG. 6
CLOCKING CIRCUIT
POWER SUPPLY CIRCUIT
PROCESSING CIRCUIT
SENSOR
COMMUNICATION CIRCUIT
HOST SYSTEM
MEASUREMENT START TIME
COMMUNICATION START TIME
S301 EN assert
S302 power on
S303 power on
MEASUREMENT
S304 power off
S305 LOW POWER CONSUMPTION MODE
S306 RETURN
S307 COMPUTATION
S308 power on
S309 TRANSMISSION INFORMATION
S310 TIME, SETTING VALUES
S311 power off
S312 CORRECT TIME, SET ALARM
S313 TURN OFF ALARM OUTPUT
S314 EN negate
S315 power off CLOCKING CIRCUIT
POWER SUPPLY CIRCUIT
PROCESSING CIRCUIT
SENSOR
COMMUNICATION CIRCUIT
HOST SYSTEM
NORMAL/ABNORMAL MONITORING TIME
S401 EN assert
S402 power on
S403 power on
CHECK OPERATION
S404 power off
S405 power on
S406 DUMMY DATA
S407 TIME, SETTING VALUES
S408 power off
S409 CORRECT TIME, SET ALARM
S410 TURN OFF ALARM OUTPUT
S411 EN negete
S412 power off ACTIVE
STANDBY
REFERENCE TIME
COMMUNICATION START TIME
MEASUREMENT START TIME
NORMAL/ABNORMAL MONITORING TIME
TIME SYNCHRONIZATION
A1
B1
B2
B3
B4
A2

SENSING APPARATUS AND SENSING SYSTEM

The present application is based on, and claims priority from JP Application Serial Number 2020-106859, filed Jun. 22, 2020, the disclosure of which is hereby incorporated by reference herein in its entirety.

BACKGROUND

1. Technical Field

The present disclosure relates to a sensing apparatus, a sensing system, and the like.

2. Related Art

There is a known approach of related art for placing a sensing apparatus in a given position and collecting data detected with a sensor provided in the sensing apparatus via a network. Placing the sensing apparatus at a structure, such as a bridge, allows monitoring of the structure.

WO 2015/019394 discloses an approach for reducing power consumption in a wireless sensor network based on information, such as a voltage regulator characteristic table and a power consumption estimation table.

When the sensing apparatus completes acquisition of data and immediately starts transmitting the data, it is difficult to perform appropriate communication depending on the situation of the network or a data receiving instrument. Approaches of related art, such as that disclosed in WO 2015/019394, cannot flexibly set the timing at which information acquired by the sensing apparatus is transmitted.

SUMMARY

An aspect of the present disclosure relates to a sensing apparatus including a sensor, a processing circuit that acquires sensor output information from the sensor, a communication circuit that transmits transmission information corresponding to the sensor output information and receives communication start time information, a power supply circuit that supplies the processing circuit with power supply voltage based on battery voltage from a battery, and a clocking circuit that operates by using the battery voltage and generates time information. The power supply circuit is activated by an instruction from the clocking circuit. The processing circuit starts acquiring the sensor output information after the power supply voltage is supplied from the activated power supply circuit. The communication circuit starts transmitting the transmission information corresponding to the acquired sensor output information at communication start time specified by the communication start time information.

Another aspect of the present disclosure relates to a sensing system including a first sensing apparatus that is the sensing apparatus described above, a second sensing apparatus, and a host system, and the host system transmits first communication start time information as the communication start time information to the first sensing apparatus and second communication time information to the second sensing apparatus, the second communication time information different from the first communication start time information in terms of the communication start time.

BRIEF DESCRIPTION OF THE DRAWINGS

FIG. 4 is a diagram for describing the procedure of a measurement process.

FIG. 5 is another diagram for describing the procedure of the measurement process.

FIG. 6 is another diagram for describing the procedure of the measurement process.

DESCRIPTION OF EXEMPLARY EMBODIMENTS

A preferable embodiment of the present disclosure will be described below in detail. It is not intended that the present embodiment described below unduly limits the contents set forth in the appended claims, and all configurations described in the present embodiment are not necessarily essential configuration requirements.

1. System Configuration

Figure 1:
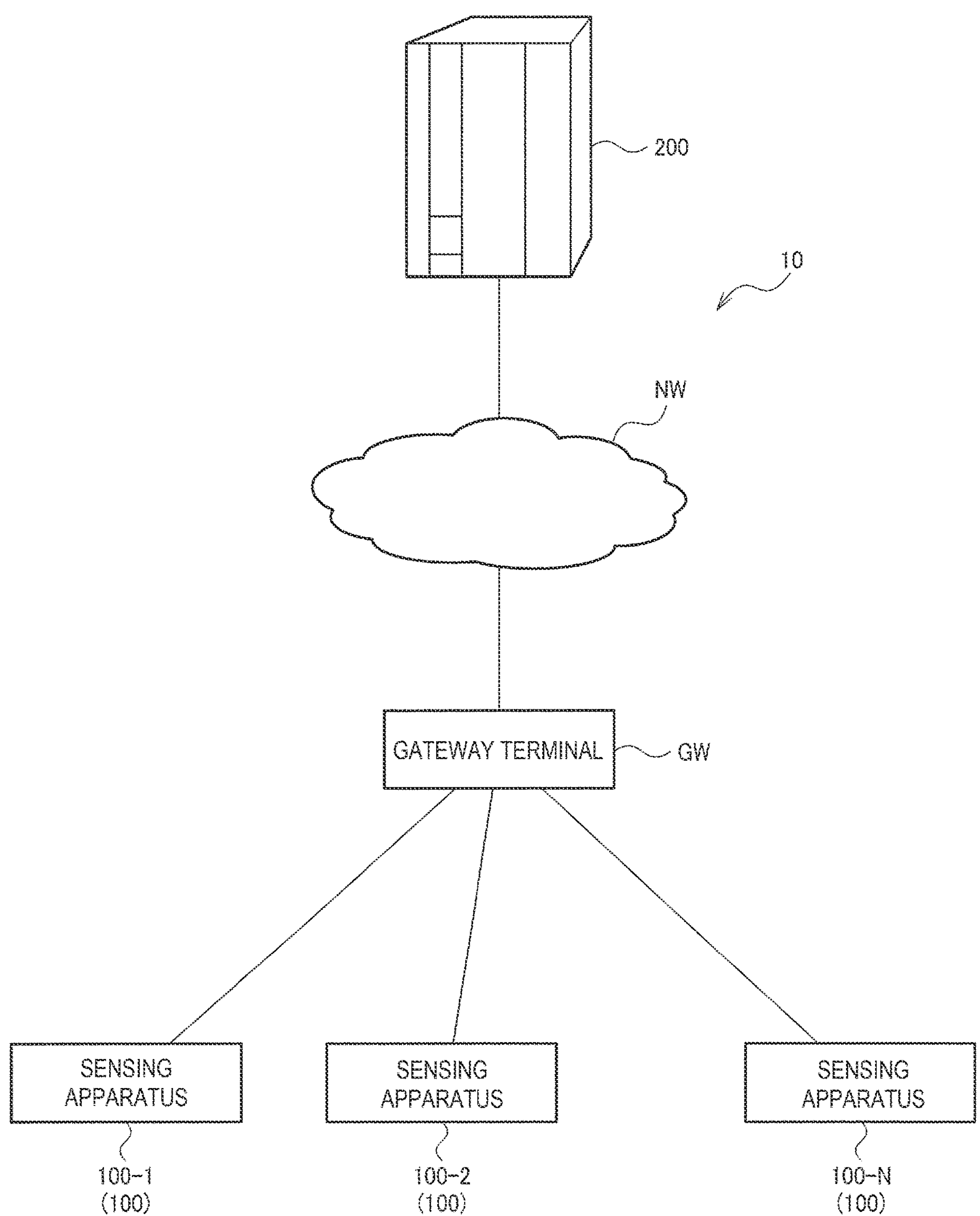
FIG. 1 shows an example of the configuration of a sensing system.

FIG. 1 shows the configuration of a sensing system 10 including sensing apparatuses 100 according to the present embodiment. The sensing system 10 includes the sensing apparatuses 100 and a host system 200, as shown in FIG. 1. FIG. 1 shows by way of example N sensing apparatuses 100, and the sensing system 10 includes a sensing apparatus 100-1, a sensing apparatus 100-2, . . . , and a sensing apparatus 100-N. N is an integer greater than or equal to two.

Figure 2:
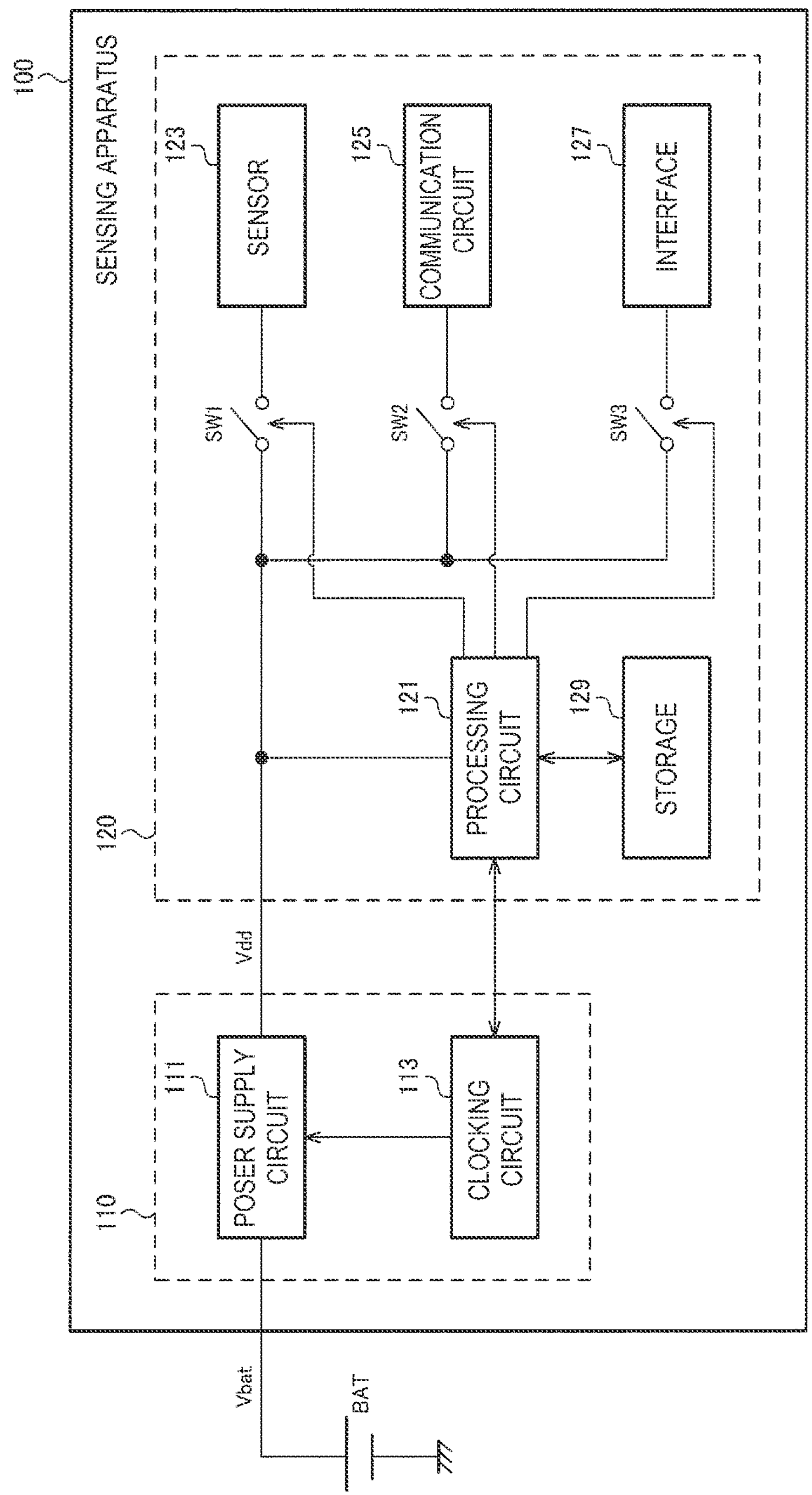
FIG. 2 shows an example of the configuration of a sensing apparatus.

The sensing apparatuses 100 each include a sensor 123 as shown in FIG. 2, and the sensor 123 outputs sensor output information. The sensing apparatuses 100 each transmit transmission information based on the sensor output information to the host system 200 via a network NW. The sensing apparatuses 100 will be described later in detail with reference to FIG. 2.

The sensing apparatuses 100 are coupled to a gateway terminal GW. Communication between the sensing apparatuses 100 and the gateway terminal GW is performed, for example, by using LPWA (low power wide area). A variety of schemes, such as LoRaWAN (registered trademark), Sigfox (registered trademark), and NB-IoT, are known as LPWA, and any of the schemes can be applied in the present embodiment. For example, the gateway terminal GW is a base station that relays the communication and functions as an Internet gateway. The sensing apparatuses 100 and the host system 200 use the gateway terminal GW to perform the communication via the network NW. The network NW in the description is, for example, a public wireless communication network, such as the Internet, and use of a private network or any other network is not inhibited. In the present embodiment, the sensing apparatuses 100 and the host system 200 only need to be capable of performing the communication via the network NW and do not necessarily have the specific configuration shown in FIG. 1.

The host system 200 is a system that manages the plurality of sensing apparatuses 100. The host system 200 manages, for example, measurement start time when the sensing apparatuses 100 each start the measurement and communication start time when the sensing apparatuses 100 each start transmitting the transmission information. The host system 200 acquires and accumulates the transmission information from the plurality of sensing apparatuses 100.

The host system 200 is, for example, a server system. The host system 200 may be formed of one server or may include a plurality of servers. The functions of the host system 200 may be achieved by distributed processing performed by a plurality of apparatuses coupled to each other via a network. In this case, the plurality of apparatuses may each operate as one physical server or as one or more virtual servers. For example, the host system 200 is a cloud system, and the specific configuration thereof can be changed in a variety of manners.

FIG. 2 shows an example of the configuration of each of the sensing apparatuses 100. The sensing apparatuses 100 each include a power supply circuit 111, a clocking circuit 113, a processing circuit 121, the sensor 123, and a communication circuit 125. The sensing apparatuses 100 may each further include an interface 127 and a storage 129. However, the sensing apparatuses 100 do not each necessarily have the configuration shown in FIG. 2, and a variety of variations are conceivable, for example, part of the components is omitted, or another component is added. For example, the interface 127 and the storage 129 may be omitted.

The power supply circuit 111 is a circuit that outputs, when a battery BAT supplies the power supply circuit 111 with battery voltage Vbat, power supply voltage Vdd based on the battery voltage Vbat. In the following description, the battery voltage is simply referred to as Vbat, and the power supply voltage outputted by the power supply circuit 111 is simply referred to as Vdd. The power supply circuit 111 is, for example, a regulator and is in a narrow sense an LDO (low dropout). For example, Vbat ranges from 7 to 8 V, and Vdd is 3.3 V. The voltage values of Vbat and Vdd are, however, not limited to those described above and can be changed in a variety of manners.

The clocking circuit 113 is a circuit that measures time, for example, an RTC (real-time clock). The clocking circuit 113 outputs time information. The time information used herein is information that specifies, for example, a year, a month, a day, an hour, a minute, and a second. The time information may further include information on a day of the week. The clocking circuit 113 includes an oscillation circuit that outputs a clock signal having a predetermined frequency based on an oscillator. The clocking circuit 113 generates, for example, a 1-Hz clock signal by dividing the clock signal outputted by the oscillation circuit and updates the time information described above in synchronization with the 1-Hz clock signal. Circuits having a variety of configurations are known as the RTC, and any of the circuits can be used in the present embodiment.

The processing circuit 121 operates based on Vdd from the power supply circuit 111. The processing circuit 121 acquires the sensor output information from the sensor 123 by controlling the sensor 123. The processing circuit 121 may carryout the process of computing the transmission information based on the sensor output information. The computation process will be described later in details. The processing circuit 121 carries out the process of transmitting the transmission information to the host system 200 by controlling the communication circuit 125. Further, the processing circuit 121 transmits and receives information to and from an external apparatus by controlling the interface 127.

Specifically, the processing circuit 121 performs on/off control of the operation of the sensor 123 by controlling a switch element SW1. The processing circuit 121 further performs on/off control of the operation of the communication circuit 125 by controlling a switch element SW2. The processing circuit 121 may further perform on/off control of the operation of the interface 127 by controlling a switch element SW3. The switch elements SW1 to SW3 are each achieved by a transistor, for example, an FET (field effect transistor) and may instead be formed of a switch having another configuration.

The processing circuit 121 in the present embodiment is formed of the hardware described below. The hardware can include at least one of a circuit that processes a digital signal and a circuit that processes an analog signal. For example, the hardware can be formed of one or more circuit apparatuses or one or more circuit elements mounted on a circuit substrate. The one or more circuit apparatuses are, for example, an IC (integrated circuit), an FPGA (field-programmable gate array), and other components. The one or more circuit elements are, for example, a resistor, a capacitor, and other elements.

The processing circuit 121 may instead be achieved by the processor described below. The sensing apparatuses 100 in the present embodiment each include a memory that stores information and a processor that operates based on the information stored in the memory. The memory is, for example, the storage 129. The information is, for example, a program and a variety of data. The processor includes hardware. The processor is, for example, an MCU (microcontroller unit) or an MPU (microprocessor unit). The processor may, for example, be a CPU (central processing unit), a GPU (graphics processing unit), or a DSP (digital signal processor). The memory may be a semiconductor memory, such as an SRAM (static random access memory) and a DRAM (dynamic random access memory), a register, a magnetic storage apparatus, such as a hard disk drive, or an optical storage apparatus, such as an optical disk apparatus. For example, the memory stores a computer readable instruction, and when the processor executes the instruction, the corresponding function of the processing circuit 121 is achieved in the form of a process. The instruction used herein may be an instruction in an instruction set that forms the program or an instruction that instructs a hardware circuit of the processor to operate in a certain manner.

The sensor 123 detects the state of a target object and outputs the sensor output information as the result of the detection. The sensor 123 is, for example, a three-axis acceleration sensor. In this case, the sensor output information is information containing data on acceleration in each of the three axes. The sensor 123 may instead be a six-axis sensor including a three-axis acceleration sensor and a three-axis gyro sensor. In this case, the sensor output information is information containing data on acceleration in each of the three axes and data on angular velocity around each of the axes. The sensor 123 may still instead be an inclination sensor that detects inclination of the target object, a vibration sensor that detects vibration of the target object, or a temperature sensor that detects the temperature of the target object or the ambient temperature around the target object. In addition to the above, the sensor 123 in the present embodiment can be extended to a variety of other sensors capable of detecting the state of the target object.

The communication circuit 125 is a circuit that performs communication for transmitting the transmission information to the host system 200. In the example shown in FIG. 1, the communication circuit 125 is a wireless communication chip or a wireless communication module that performs communication in compliance with the LPWA standard. As described above, the configuration that allows the sensing apparatuses 100 and the host system 200 to communicate with each other is not limited to the configuration shown in FIG. 1, and the communication circuit 125 may be a wireless communication chip that performs communication in compliance with a standard other than the LPWA standard.

The interface 127 is a communication interface between the sensing apparatuses 100 and an external information processing apparatus. The interface 127 may be a UART (universal asynchronous receiver/transmitter) or another interface. For example, the interface 127 may be an SPI (serial peripheral interface) or an I2C (inter-integrated circuit). The interface 127 is used, for example, in an initialization process described later with reference to FIG. 10.

The storage 129 stores a variety of pieces of information, such as data and programs. The processing circuit 121 operates, for example, by using the storage 129 as a work area. The storage 129 may be an EEPROM (electrically erasable programmable read-only memory) or a flash memory, such as a MONOS (metal-oxide-nitride-oxide-silicon) memory. The storage 129 may be a semiconductor memory, such as an SRAM and a DRAM, a register, a magnetic storage apparatus, or an optical storage apparatus.

The sensing apparatuses 100 according to the present embodiment each include a first circuit 110, which operates based on Vbat, and a second circuit 120, which operates based on Vdd, as shown in FIG. 2. The first circuit 110 includes the power supply circuit 111 and the clocking circuit 113. The second circuit 120 includes the processing circuit 121, the sensor 123, the communication circuit 125, the interface 127, and the storage 129. When the power supply circuit 111 stops outputting Vdd, each portion provided in the second circuit 120 stops operating. More specifically, when Vdd is not supplied, the processing circuit 121 does not operate, so that the sensor 123 or the communication circuit 125 controlled by the processing circuit 121 also does not operate. The power supply circuit 111 can stop supplying Vdd to efficiently reduce the power consumed by the sensing apparatuses 100.

For example, the power supply circuit 111 is a circuit that operates when an enable signal is asserted and stops operating when the enable signal is negated. The enable signal is controlled based on an alarm output from the clocking circuit 113. Specifically, the power supply circuit 111 is enabled when the alarm output from the clocking circuit 113 is on, and the power supply circuit 111 is disabled when the alarm output is off. The thus configured power supply circuit 111 can control whether or not Vdd is outputted, that is, the operation of each portion provided in the second circuit 120 based on the alarm output from the clocking circuit 113.

Figure 3:
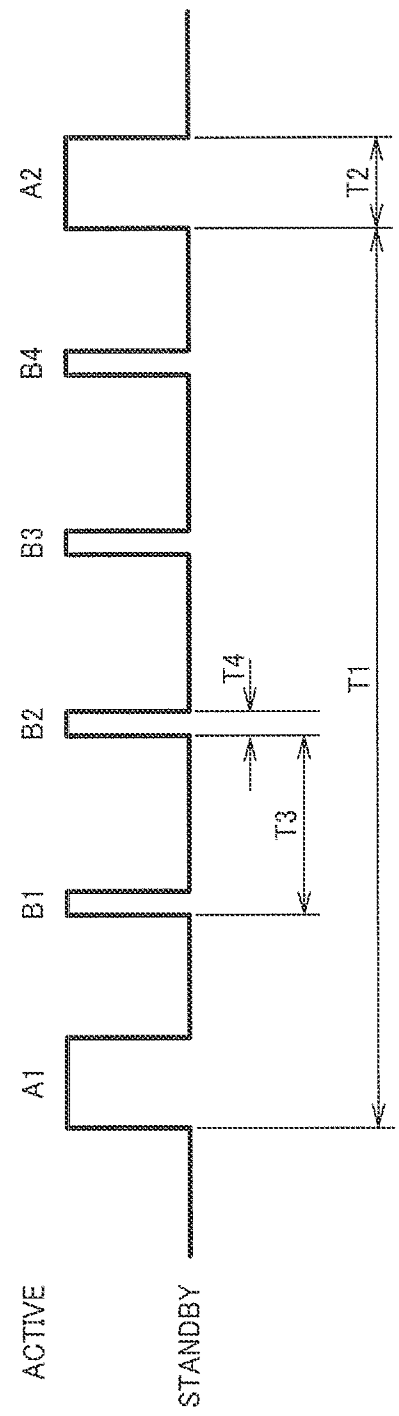
FIG. 3 describes intermittent operation of the sensing apparatus.

FIG. 3 describes intermittent operation of the sensing apparatuses 100 according to the present embodiment. The horizontal axis of FIG. 3 represents time. In FIG. 3, "ACTIVE" represents the state in which the power supply circuit 111 outputs Vdd, and "STANDBY" represents the state in which the power supply circuit 111 does not output Vdd. An ACTIVE period is a period for which the processing circuit 121 is operable but is not necessarily a period for which each portion of the second circuit 120 always operates. For example, since the sensor 123 and the communication circuit 125 are turned on and off by the processing circuit 121, the ACTIVE period has a period for which neither the sensor 123 nor the communication circuit 125 operates. In the ACTIVE period, the processing circuit 121 may operate in a low power consumption mode in which the power consumption is lower than that in a normal operation mode, as will be described later.

A1 and A2 in FIG. 3 each represent a measurement period. The measurement period is a period for which the sensor 123 performs the measurement and the communication of the transmission information is performed. Processes carried out in the measurement period will be described later in detail with reference to FIGS. 4 to 6.

The sensor 123 performs the measurement at the intervals labeled with T1, and one measurement period has a length T2. For example, T1 has a length of about one month, and T2 has a length of about one hour. For example, measurement start time information representing the measurement start time is set in advance in the clocking circuit 113. The measurement start time information used herein is information that can specify a year, a month, a day, an hour, a minute, and a second. For example, the measurement start time is the same time on the first day of every month. The clocking circuit 113 enables the power supply circuit 111 by turning on the alarm output when the current time reaches the measurement start time. After the processes to be carried out in the measurement period are completed, the processing circuit 121 instructs the clocking circuit 113 to turn off the alarm output. The power supply circuit 111 is thus disabled.

The sensing apparatuses 100 can each thus acquire the sensor output information at the intervals labeled with T1 and transmit the transmission information based on the sensor output information to the host system 200. For example, the power consumption can be reduced by causing the sensing apparatuses 100 to operate in the ACTIVE state only in A1, A2 and other measurement periods and causing the sensing apparatuses 100 to operate in the STANDBY state in the other periods. Since Vdd is not supplied to the second circuit 120 in the STANDBY period, the current consumed, for example, by a pullup resistor in a peripheral circuit of the processing circuit 121 can also be reduced. Further, the resistance of the pullup resistor can be set at a large value that provides noise immunity.

When all periods other than the measurement periods are the STANDBY periods, however, the host system 200 can check the states of the sensing apparatuses 100 only once a month. For example, even when any of the sensing apparatuses 100 experiences abnormality, such as failure, the abnormality cannot be detected until the next measurement period. As a result, it is likely that the sensing is not performed properly in the next measurement period and part of the information is lost. Since the sensing apparatuses 100 according to the present embodiment are used to monitor, for example, a structure, loss of part of the information is not preferable.

Operating status monitoring of the sensing apparatuses 100 may therefore be performed. B1, B2, B3, and B4 in FIG. 3 each represent the operating status monitoring period. The operating status monitoring period is a period for checking whether or not the sensing apparatuses 100 are operating normally. Processes carried out in the operating status monitoring period will be described later in detail.

The operating status monitoring is performed at the intervals labeled with T3, and one operating status monitoring period has a length T4. T3 is shorter than T1. T4 is shorter than T2. For example, T3 has a length of about one week, and T4 has a length of about several minutes. For example, operating status monitoring time information representing the time when the operating status monitoring starts is set in advance in the clocking circuit 113. The time when the operating status monitoring starts is hereinafter referred to as operating status monitoring time. The operating status monitoring time information used herein is information that can specify a year, a month, a day, an hour, a minute, and a second. For example, the operating status monitoring time is the same time every Wednesday. The clocking circuit 113 enables the power supply circuit 111 by turning on the alarm output when the current time reaches the operating status monitoring time. After the operating status monitoring is completed, the processing circuit 121 instructs the clocking circuit 113 to turn off the alarm output. The power supply circuit 111 is thus disabled.

Performing the operating status monitoring as described above allows appropriate monitoring of the states of the sensing apparatuses 100. Since abnormality of any of the sensing apparatuses 100 is detected at an early stage, the abnormal sensing apparatus 100 can be repaired or otherwise handled by the next measurement period. Since the sensor 123 does not need to perform the measurement for a long period in the operating status monitoring period, the operating status monitoring period can be shorter than the measurement period. The ACTIVE period is therefore not excessively long even when the operating status monitoring is performed, whereby the power consumed by the sensing apparatuses 100 can be reduced. In the approach of the present embodiment, however, the operating status monitoring is not essential and can be omitted.

The approach of related art, such as that described in WO 2015/019394 described above, does not consider the relationship between the measurement start time and the communication start time at which transmission of the result of the measurement starts. For example, the transmission of the transmission information starts at the timing at which the transmission information to be transmitted is ready.

Collision, however, occurs when the plurality of sensing apparatuses 100 communicate with the host system 200 as shown in FIG. 1 and two or more sensing apparatuses 100 simultaneously transmit the transmission information. In particular, in the communication between the sensing apparatuses 100 and the gateway terminal GW, a protocol that does not perform sufficient retransmission control may be used. Therefore, when the plurality of sensing apparatuses 100 simultaneously transmit information to the gateway terminal GW, the information may be lost due to the collision. Further, the collision not only occurs in the communication between the sensing apparatuses 100 and a relay apparatus, such as the gateway terminal GW, but may occur in some cases when the host system 200 receives data.

The measurement start time is determined based, for example, on the purpose of the measurement. For example, when a sensing apparatus 100 is placed on a bridge, such as a railway bridge, as will be described later with reference to FIG. 11, the sensing apparatus 100 detects a physical quantity representing the displacement of the bridge that occurs when a train moves on the bridge. The detection can be made by arbitrary one-hour measurement, and it is also useful to specify the measurement period, for example, the measurement start time, the measurement end time, the day of the week, the day, and the month. The reason for this is that the type and formation of a train that travels on the bridge vary depending on the time zone and measurement according to the purpose can be made by setting a time zone in which a desired train will travel to be the measurement period.

It is therefore difficult in some cases to avoid the collision by adjusting the measurement start time. There is, for example, a case where two sensing apparatuses 100 are placed at opposite ends of a single bridge and measures the displacement of the bridge produced by the movement of a given train. In this case, it is highly probable that the plurality of sensing apparatuses 100 perform the transmission simultaneously.

As described above, the communication start time needs to be taken into consideration to avoid the collision. The above description has been made with reference to the collision, and there are other cases where the communication start time needs to be set. For example, when the host system 200 carries out a large-load process, it is desirable in some cases to receive data after the process is completed, and it is therefore meaningful to control the communication start time in the sensing apparatuses 100. In related-art approaches, however, the communication start time is not fully taken into consideration.

The sensing apparatuses 100 according to the present embodiment each include the sensor 123, the processing circuit 121, the communication circuit 125, the power supply circuit 111, and the clocking circuit 113, as shown in FIG. 2. The processing circuit 121 acquires the sensor output information from the sensor 123. The communication circuit 125 transmits the transmission information corresponding to the sensor output information and receives communication start time information. The power supply circuit 111 supplies the processing circuit 121 with the power supply voltage Vdd based on the battery voltage Vbat from the battery BAT. The clocking circuit 113 operates by using the battery voltage Vbat and generates the time information.

The power supply circuit 111 is activated by an instruction from the clocking circuit 113. For example, the enable signal for the power supply circuit 111 is controlled based on the alarm output from the clocking circuit 113, as described above. The processing circuit 121 starts acquiring the sensor output information after the power supply voltage Vdd is supplied from the activated power supply circuit 111. The communication circuit 125 then starts transmitting the transmission information corresponding to the acquired sensor output information at the communication start time specified by the communication start time information.

According to the approach of the present embodiment, receipt of the communication start time information allows the communication start time, at which the transmission of the transmission information starts, to be set. Since the transmission timing can be flexibly changed, the collision and other disadvantageous behaviors can be avoided. As a result, the host system 200 can appropriately receive information from the sensing apparatuses 100.

The approach of the present embodiment is applicable to the sensing system 10 including a first sensing apparatus, a second sensing apparatus, and the host system 200. The first sensing apparatus is, for example, the sensing apparatus 100-1 in FIG. 1, and the second sensing apparatus is, for example, the sensing apparatus 100-2 in FIG. 1. The first and second sensing apparatuses correspond to the sensing apparatuses 100 described above. The host system 200 transmits first communication start time information as the communication start time information to the first sensing apparatus. The host system 200 transmits second communication start time information different from the first communication start time information in terms of communication start time to the second sensing apparatus.

Therefore, when a plurality of sensing apparatuses 100 are used, the sensing apparatuses 100 can each have communication start time different from the others. Further, the host system 200 can collectively manage the communication start time in the plurality of sensing apparatuses 100. For example, communication start time appropriate for each of the sensing apparatuses 100 can be set based on the measurement period, the operating status monitoring period, the operation schedule, and other factors of each of the sensing apparatuses 100.

2. Details of Processes 2.1 Measurement Process

FIG. 4 describes the procedure of the processes in the measurement period. It is assumed that the initialization process described later with reference to FIG. 10 has been completed and the measurement start time has been set in the clocking circuit 113 before the processes in FIG. 4 are carried out. It is further assumed that the sensing apparatuses 100 each have acquired the communication start time information. Further, before the start of the processes shown in FIG. 4, the sensing apparatuses 100 operate in the STANDBY state in FIG. 3, and that Vbat from the battery BAT is supplied but only the clocking circuit 113 is in operation. It is noted that FIG. 4 diagrammatically shows the procedure of the processes, and that the length in the vertical axis direction does not represent a specific length of time. The same holds true for FIGS. 5 to 7 and 10 described later.

First, the clocking circuit 113 compares the time information held thereby with the measurement start time indicated by the measurement start time information. The clocking circuit 113 turns on the alarm output when the current time reaches the measurement start time. Specifically, in step S101, the clocking circuit 113 asserts the enable signal for the power supply circuit 111.

When the enable signal is asserted, the power supply circuit 111 outputs Vdd based on Vbat. Specifically, in step S102, the power supply circuit 111 turns on the processing circuit 121 by supplying the processing circuit 121 with Vdd.

In step S103, the processing circuit 121 turns on the sensor 123 to cause the sensor 123 to start the measurement. Specifically, the processing circuit 121 turns on the switch element SW1 to start supplying the sensor 123 with Vdd. The sensor 123 operates based on Vdd to output the sensor output information to the processing circuit 121.

One-bout measurement performed by the sensor 123 continues for, for example, one hour. Therefore, when one hour has elapsed from the start of the measurement, the processing circuit 121 turns off the sensor 123 to terminate the measurement in step S104. Specifically, the processing circuit 121 turns off the switch element SW1 to stop supplying the sensor 123 with Vdd.

Thereafter, in step S105, the processing circuit 121 carries out the computation process based on the sensor output information from the sensor 123 to generate transmission information. The transmission information is, for example, information that serves as an index representing whether or not abnormality has occurred in a target object under the sensing.

For example, the processing circuit 121 acquires time-series data on acceleration as the sensor output information from the sensor 123. The processing circuit 121 performs frequency conversion, such as Fourier transform, on the time-series data. For example, the processing circuit 121 carries out the process of determining a peak frequency and the spectral intensity at the peak frequency as the transmission information based on the result of the Fourier transform. The processing circuit 121 may evaluate whether or not abnormality has occurred by comparing a normal-time peak frequency and spectral intensity acquired in advance with the peak frequency and the spectral intensity determined by the computation. The transmission information in this case is information representing whether or not abnormality has occurred.

The processing circuit 121 may instead carry out the process of determining the velocity or displacement of the target object by integrating the acceleration data. The transmission information is, for example, the displacement of a given portion of the target object. The processing circuit 121 may evaluate whether or not abnormality has occurred by comparing the determined displacement with a given threshold.

Instead, the processing circuit 121 may determine, as the transmission information, ratio information representing the ratio between the maximum amplitude of the acceleration in a bridge axis direction and the maximum amplitude of the acceleration in a direction perpendicular to the bridge axis. The ratio information is known to correlate with the natural frequency of the target object and is therefore information suitable for monitoring of the target object. There is also a known approach using a power spectrum of regular slight movement caused by a natural phenomenon, such as wind, as the index that correlates with the natural frequency, and the processing circuit 121 in the present embodiment may compute information based on the power spectrum as the transmission information.

The processing circuit 121 may carry out, as pre-processing of the process described above, the process of extracting information corresponding to a movement period for which a moving body, such as a train or a car, moves from the sensor output information acquired by the one-hour measurement. For example, acceleration has a large amplitude when the moving object is moving and a small amplitude when no moving object is present. The processing circuit 121 can therefore evaluate whether or not a moving body is present based on the amplitude of the acceleration. The processing circuit 121 determines the period for which the moving body is continuously present as one movement period. When a plurality of moving bodies move in one hour, a plurality of movement periods are set. The above process, such as the Fourier transform and the integration, is performed on a movement period basis. The transmission information may be a set of the indexes determined in each movement period. The processing circuit 121 may instead determine the statistic of the indices determined in each movement period and use the statistic as the transmission information. The statistic used herein may be an average value, a maximum, or another statistic. The computation process in step S105 may be the process of extracting information on the movement period from the sensor output information.

Referring back to FIG. 4, the description resumes. The computation process generates the transmission information to be transmitted. It is, however, noted in the approach of the present embodiment that the timing at which the computation of the transmission information is completed does not always correspond to the communication start time. The processing circuit 121 therefore waits after the completion of the computation process in step S105 but before the communication start time indicated by the communication start time information. The processing circuit 121 may acquire the current time used to evaluate whether or not the communication start time has been reached from the clocking circuit 113. The processing circuit 121 may instead acquire the time information from the clocking circuit 113 at the time of the activation of the processing circuit 121 and measure the current time afterward, for example, by using the operating clock signal of the processing circuit 121 itself. The communication start time may also be set in the clocking circuit 113, and the alarm signal may be outputted from the clocking circuit 113 to the processing circuit 121 when the current time reaches the communication start time.

Thereafter, when the current time reaches the communication start time, the processing circuit 121 turns on the communication circuit 125 to cause the communication circuit 125 to start transmitting the transmission information in step S106. Specifically, the processing circuit 121 turns on the switch element SW2 to start supplying the communication circuit 125 with Vdd. The communication circuit 125 operates based on Vdd to transmit the transmission information to the host system 200. As described above with reference to FIG. 1, the communication with the host system 200 may, for example, be the communication via the gateway terminal GW.

The communication circuit 125 in the present embodiment may be capable of receiving information from the host system 200 in a given receipt period after the transmission information is transmitted. Suppression of the receipt outside the receipt period allows the time for which the communication circuit 125 operates to be shortened, whereby the power consumption can be reduced.

In step S108, the communication circuit 125 receives information from the host system 200. The received information is, for example, reference time information and setting values. The setting values include, for example, the measurement start time information, the communication start time information, and the operating status monitoring time information. The reference time information is information for correcting the time information outputted by the clocking circuit 113. For example, the host system 200 can acquire standard time via the network NW, such as the Internet. The host system 200 transmits information based on the standard time as the reference time information to the sensing apparatuses 100.

After the receipt period ends, the processing circuit 121 turns off the communication circuit 125 to terminate the communication in step S109. Specifically, the processing circuit 121 turns off the switch element SW2 to stop supplying the communication circuit 125 with Vdd.

In step S110, the processing circuit 121 sets the clocking circuit 113 based on the information received by the communication circuit 125 in step S108. Specifically, the processing circuit 121 corrects the time information from the clocking circuit 113 based on the reference time information. Further, the processing circuit 121 carries out the process of setting the measurement start time information and the operating status monitoring time information in the clocking circuit 113. The clocking circuit 113 can thus turn on the alarm output at the measurement start time or the operating status monitoring time. The measurement start time or the operating status monitoring time set at this point is information for starting the next measurement period or operating status monitoring period and the following measurement periods or operating status monitoring periods, as will be described later with reference to FIG. 8.

In step S111, the processing circuit 121 turns off the alarm output from the clocking circuit 113. The clocking circuit 113 thus negates the enable signal for the power supply circuit 111 in step S112. When the enable signal is negated, the power supply circuit 111 stops outputting Vdd based on Vbat. Specifically, the power supply circuit 111 turns off the processing circuit 121 by stopping supplying Vdd in step S113.

The communication circuit 125 receives the measurement start time information, as shown in step S108 in FIG. 4. The clocking circuit 113 activates the power supply circuit 111 at the measurement start time specified by the measurement start time information to supply the processing circuit 121 with the power supply voltage Vdd, as shown in step S101. The measurement start time can thus be determined based on the information received by the communication circuit 125. For example, the host system 200 sets the measurement start time in each of the sensing apparatuses 100. Further, controlling the activation and termination of the power supply circuit 111 by using the alarm output from the clocking circuit 113 allows the power supply circuit 111 to operate only at a specific timing. The period of the STANDBY state can thus be increased as shown in FIG. 3, whereby the power consumption can be reduced.

In FIG. 4 shown above, after the transmission information is generated by the computation process shown in step S105, the processing circuit 121 operates in the STANDBY state until the communication start time shown in step S106. For example, when the period between the generation of the transmission information and the communication start time is short, the power consumption is unlikely to be a problem even when the processing circuit 121 keeps operating in the normal operation state. In the present embodiment, however, the relationship between the measurement start time and the communication start time can be flexibly changed. The period from the generation of the transmission information to the communication start time is therefore a relatively long period ranging from about several tens of minutes to several hours in some cases. When the processing circuit 121 keeps operating in the normal operation state in the period described above, the power consumption in the measurement period disadvantageously increases. It is unlikely to be assumed that the period from the generation of the transmission information to the communication start time is a further longer period, such as one day to several days. It cannot therefore be said that it is efficient control to cause the clocking circuit 113 to turn on the alarm output at the communication start time after the power supply circuit 111 is temporarily shut down.

The processing circuit 121 in the present embodiment may therefore operate in the low power consumption mode until the communication start time. The power consumption in the measurement period can thus be reduced.

The low power consumption mode used herein is an operation mode in which power consumption is lower than that in the normal operation mode. For example, when the operating clock of the processing circuit 121 in the normal operation mode has a first frequency, and the operating clock of the processing circuit 121 in the low power consumption mode has a second frequency, the second frequency is lower than the first frequency. Instead, when the processing circuit 121 is formed of a plurality of circuit blocks, the normal operation mode is a mode in which all the circuit blocks operate, and the low power consumption mode is an operation mode in which at least one circuit block is not in operation. Still instead, the low power consumption mode may be an operation mode in which the frequency of the clock signal supplied to at least one of the circuit blocks is lower than that in the normal operation mode. As described above, the low power consumption mode only needs to be a mode in which the power consumption relatively decreases, and the specific operation in the low power consumption mode can be changed in a variety of manners.

FIG. 5 is another flowchart for describing the procedure of the processes in the measurement period. Steps S201 to S205 in FIG. 5 are the same as steps S101 to S105 in FIG. 4. After the computation process in step S205, the processing circuit 121 carries out the process of transitioning to the power saving mode in step S206. The processing circuit 121 then returns to the normal operation mode in step S207 before the communication start time. In the period between step S206 and step S207, the processing circuit 121 operates in the low power consumption mode.

For example, the processing circuit 121 sets, as return time, time a given period earlier than the communication start time. The processing circuit 121 performs a return process in step S207 when the current time reaches the return time. The processing circuit 121 may instead start the process of counting time in step S206 and carry out the process in step S207 when the result of the counting is greater than or equal to a given waiting period. The waiting period may be determined based on the time when the process in step S206 is carried out and the communication start time whenever the counting is performed, or a value may be set in advance as the waiting period.

The detailed descriptions of the processes after the processing circuit 121 returns to the normal operation mode, that is, the processes insteps S208 to S215 are omitted because the processes are the same as those in steps S106 to S113 in FIG. 4.

FIG. 6 is another flowchart for describing the procedure of the processes in the measurement period. Steps S301 to S304 in FIG. 6 are the same as steps S201 to S204 in FIG. 5, and steps S308 to S315 in FIG. 6 are the same as steps S208 to S215 in FIG. 5.

In the processes shown in FIG. 6, the processing circuit 121 completes the acquisition of the sensor output information in step S304, stops supplying the sensor 123 with Vdd, and then transitions to the power saving mode in step S305. The processing circuit 121 then returns to the normal operation mode in step S306 before the communication start time. In the period between step S305 and step S306, the processing circuit 121 operates in the low power consumption mode. After returning from the low power consumption mode, the processing circuit 121 carries out the process of computing the transmission information based on the sensor output information in step S307. That is, comparison between FIG. 5 and FIG. 6 shows that the order of the computation process and the transition to the low power consumption mode is reversed.

The sensing apparatuses 100 according to the present embodiment only need to start the measurement at the measurement start time and start transmitting the transmission information at the communication start time. The process of computing the transmission information can therefore be carried out at any timing after the acquisition of the sensor output information but before the communication start time. Therefore, the processing circuit 121 may transition to the low power consumption mode after the computation process, as shown in FIG. 5, or may carry out the computation process after the transition to the low power consumption mode, as shown in FIG. 6. The computation process may be carried out dividing into at least two parts with the transition to the low power consumption mode sandwiched between the computation processes. The processing circuit 121 may transition to the low power consumption mode dividing into multiple times after the acquisition of the sensor output information but before the communication start time.

When the processing circuit 121 transitions to the low power consumption mode before carrying out the process of computing the transmission information, the period for which the low power consumption mode continues needs to be carefully set. For example, the processing circuit 121 estimates a processing period required for the computation process and returns to the normal operation mode at the timing at least the processing period earlier than the communication start time. The probability of completion of generation of the transmission information by the communication start time can thus be increased.

As described above, the processing circuit 121 generates the transmission information by performing given operation on the sensor output information. The processing circuit 121 then transmits the transmission information generated by the computation after returning from the low power consumption mode. As described above with reference to FIGS. 5 and 6, the order of the transition to the low power consumption mode and the computation process can be changed in a variety of manners. The power consumption in the measurement period can thus be appropriately reduced even when there is a time lag between the acquisition of the sensor output information and the communication start time.

The processing circuit 121 causes the communication circuit 125 to transmit the transmission information by supplying the communication circuit 125 with the power supply voltage Vdd from the power supply circuit 111 after returning from the low power consumption mode. The power consumption can thus be reduced by turning on the communication circuit 125 in the period in which communication including the transmission of the transmission information is performed for appropriate communication and turning off the communication circuit 125 in the periods before the communication period.

The case where the processing circuit 121 computes the transmission information based on the sensor output information has been described above, the process in the present embodiment is not limited to the process described above. For example, the processing circuit 121 may transmit the sensor output information as the transmission information after returning from the low power consumption mode. In other words, the computation process described above may be omitted. In this case, the processing load on the sensing apparatuses 100 can be reduced although the amount of transmission information data increases. The computation process described above may be carried out by a relay apparatus, such as the gateway terminal GW, or by the host system 200.

The processes shown in FIGS. 4 to 6 may each be determined in advance whether to be carried out. For example, a sensing apparatus 100 in which the time difference between the measurement start time and the communication start time is small is set to carry out the processes in FIG. 4, and a sensing apparatus 100 in which the time difference is large is set to carry out the processes in FIG. 5 or 6. Instead, the processing circuit 121 of each of the sensing apparatuses 100 can carry out a plurality of the processes, such as those in FIGS. 4 to 6, and may dynamically determine which processes out of the plurality of processes to be performed based on the measurement start time information and the communication start time information received by the communication circuit 125.

2.2 Operating Status Monitoring

Figure 7:
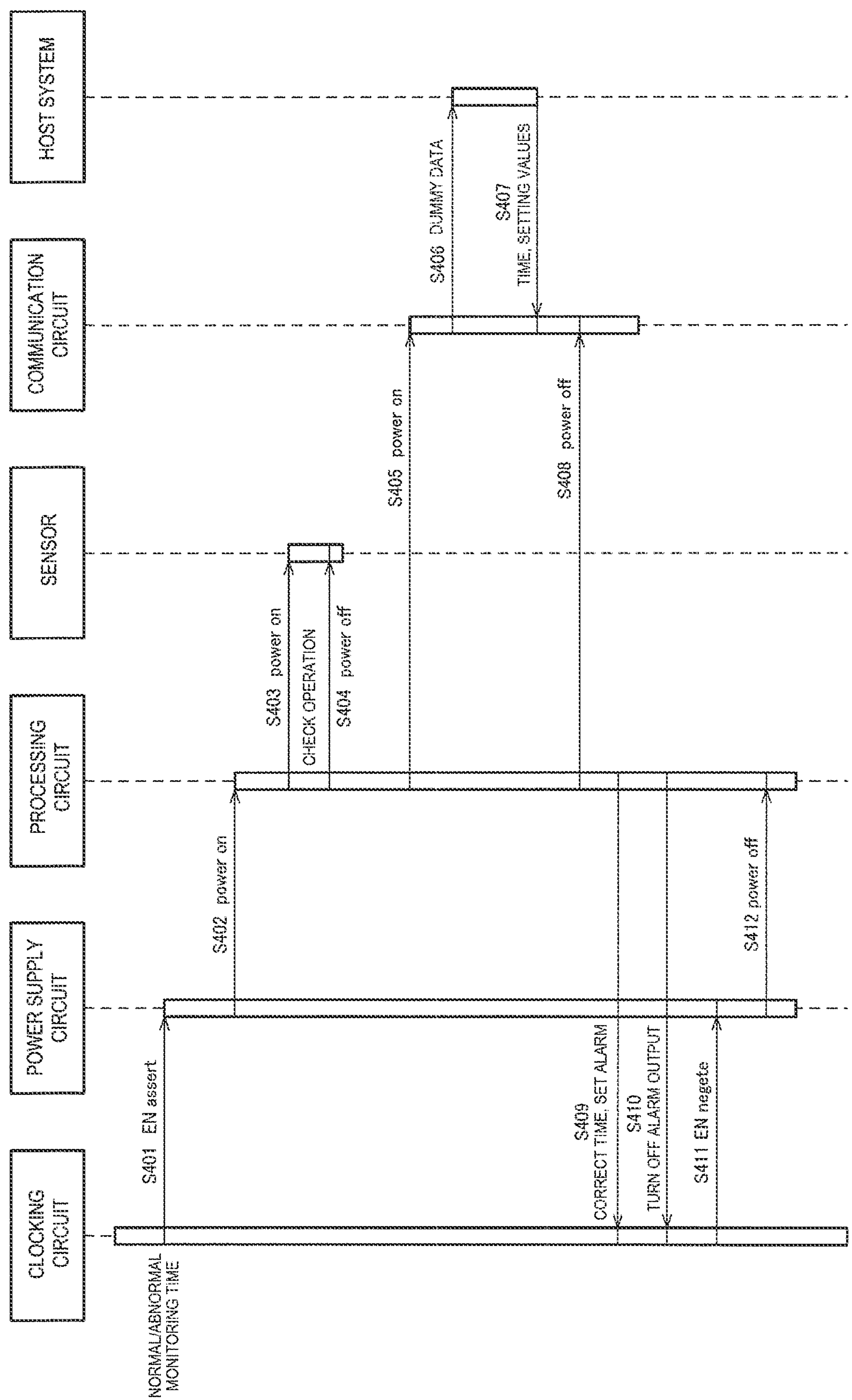
FIG. 7 describes the procedure of an operating status monitoring process.

FIG. 7 describes the procedure of the processes in the operating status monitoring period. Comparison between FIGS. 7 and 4 shows that the processes in the operating status monitoring period conform to the processes in the measurement period. However, in the operating status monitoring period, the processing circuit 121 only needs to ascertain whether or not the sensing apparatuses 100 operate normally but needs to perform no specific measurement, so that part of the steps shown in FIG. 4 can be omitted.

The clocking circuit 113 first compares the time held thereby with the operating status monitoring time indicated by the operating status monitoring time information. The clocking circuit 113 turns on the alarm output when the current time reaches the operating status monitoring time. Specifically, in step S401, the clocking circuit 113 asserts the enable signal for the power supply circuit 111. In step S402, the power supply circuit 111 turns on the processing circuit 121 by supplying the processing circuit 121 with Vdd.

In step S403, the processing circuit 121 turns on the sensor 123 to cause the sensor 123 to start the measurement. In the operating status monitoring period, however, the processing circuit 121 only needs to ascertain that the sensor 123 is outputting information, and the sensor 123 has a low necessity of continuing the measurement for a long period. For example, the processing circuit 121 turns off the sensor 123 to terminate the measurement in step S404 at the timing at which the processing circuit 121 checks that the sensor output information is outputted.

In the operating status monitoring period, the processes in steps S403 and S404 may be omitted. In this case, abnormality of the sensor 123 cannot be detected, but the operation of the power supply circuit 111, the clocking circuit 113, the processing circuit 121, the communication circuit 125, and other circuits can be checked.

Further, the computation process in step S105 can be omitted in the operating status monitoring period, as shown in FIG. 7. Performing the computation process is, however, not inhibited. For example, the sensor 123 outputs the sensor output information having an amount large enough to allow Fourier transform or integration. The processing circuit 121 may carry out the process of determining information having the same format as that of the transmission information by carrying out the variety of processes described above.

In the operating status monitoring period, the processing circuit 121 has a low necessity of adjusting the relationship between the operating status monitoring time and the communication start time. The reason for this is that in the operating status monitoring period, the processing circuit 121 has a low necessity of acquiring the sensor output information in the desired period and only needs to adjust the operating status monitoring time itself to avoid the collision. Therefore, after the process in step S404, the processing circuit 121 does not wait or transition to the low power consumption mode but turns on the communication circuit 125 to cause the communication circuit 125 to start transmitting the operating status monitoring information in step S405. For example, in step S406, the communication circuit 125 transmits dummy data having an arbitrary content to the host system 200. The operating status monitoring information may be a specific data string representing the operating status monitoring. Use of the communication start time information is not inhibited in the operating status monitoring period. The processing circuit 121 may carry out the process of transitioning to the low power consumption mode and the process of returning therefrom before the process in step S405, as in the cases shown, for example, in FIGS. 5 and 6.

In step S407, the communication circuit 125 receives information from the host system 200. The time synchronization and setting the communication start time information and other pieces of information may be performed in the measurement period, as will be described later with reference to FIG. 8. In this case, the communication circuit 125 may skip the receipt of the information from the host system 200 in step S407. Instead, the communication circuit 125 may receive the reference time information, the measurement start time information, the operating status monitoring time information, the communication start time information, and other pieces of information from the host system 200 in step S407, as will be described later with reference to FIG. 9. In step S408, the processing circuit 121 turns off the communication circuit 125 to terminate the communication.

In step S409, the processing circuit 121 sets the clocking circuit 113 based on the information received by the communication circuit 125 in step S407. As described above, when the receipt of the information in step S407 is omitted, the process in step S409 is also omitted.

In step S410, the processing circuit 121 turns off the alarm output from the clocking circuit 113. The clocking circuit 113 thus negates the enable signal for the power supply circuit 111 in step S411. When the enable signal is negated, the power supply circuit 111 stops outputting Vdd based on Vbat. Specifically, in step S412, the power supply circuit 111 turns off the processing circuit 121 by stopping supplying the processing circuit 121 with Vdd.

The procedure of the processes in the measurement period and that in the operating status monitoring period differ from each other, as shown in FIGS. 4 to 6 and 7. The processing circuit 121 therefore evaluates whether the current time falls within the measurement period or the operating status monitoring period when the power supply circuit 111 starts supplying Vdd and the processing circuit 121 starts operating. The processing circuit 121 then determines whether to carry out the processes shown, for example, in FIGS. 4 to 6 or the processes shown in FIG. 7 based on the result of the evaluation. Since the measurement start time information and the operating status monitoring time information have been received before the processing circuit 121 is activated, the processing circuit 121 can determine whether the current time falls within the measurement period or the operating status monitoring period based on the received information and the current time.

2.3 Timing of Acquisition of Communication Start Time Information

The communication circuit 125 in the present embodiment may transmit, based on the communication start time information received by communication circuit 125 in an i-th activation period, the transmission information in a j-th activation period after the i-th activation period. Symbol i is a positive integer, and symbol j is an integer that satisfies j>i. The activation period used herein is the period in which a sensing apparatus 100 is activated, and in a narrow sense, the period in which the power supply circuit 111 is activated. Specifically, the activation period is the period in which the alarm output from the clocking circuit 113 is turned on. An (i+1)-th activation period is the activation period adjacent to the i-th activation period and later in time than the i-th activation period.

The activation period includes the measurement period and the operating status monitoring period. The i-th activation period may, for example, be the measurement period.

Figure 8:
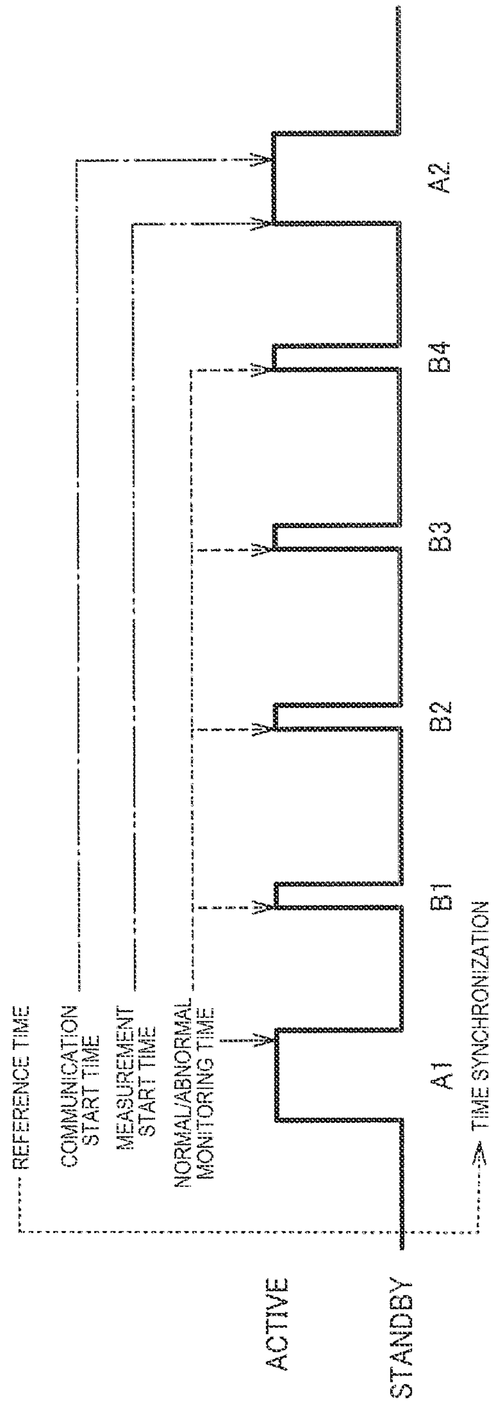
FIG. 8 is a diagram for describing the timings at which communication start time information and other pieces of information are acquired.

FIG. 8 describes the timings at which the communication start time information and other pieces of information are set. FIG. 8 is similar to FIG. 3, and the horizontal axis of FIG. 8 represents time. The ACTIVE period is the period in which the power circuit 111 is activated and is the activation period described above. A1 and A2 are each the measurement period, and B1 to B4 are each the operating status monitoring period. The solid line in FIG. 8 indicates the activation period in which each of the pieces of information is acquired and set. The broken line in FIG. 8 indicates the activation period in which each of the set pieces of information is used. The same holds true for FIG. 9.

For example, when the measurement period labeled with A2 is the j-th activation period, the i-th activation period is the measurement period labeled with A1. The processes in the measurement period are those described above with reference to FIGS. 4 to 6, and the communication circuit 125 receives the reference time information, the measurement start time information, the communication start time information, and the operating status monitoring time information in the process shown in step S108, S210, or S310 in the measurement period labeled with A1. The time synchronization in the clocking circuit 113 is then performed by using the time information, as shown in steps S110, S212, and S312. The synchronization used herein is the process of matching the time information from the clocking circuit 113 with the reference time information received from the host system 200. The time synchronization is thus performed in A1, which is the i-th activation period, as shown in FIG. 8. In steps S110, S212, and S312, the measurement start time information and the operating status monitoring time information are set in the clocking circuit 113.

After the measurement period labeled with A1 ends, the clocking circuit 113 turns on the alarm output based on the set measurement start time information or operating status monitoring time information. Specifically, when the clocking circuit 113 turns on the alarm output based on the operating status monitoring time information, the operating status monitoring periods labeled with B1 to B4 start. In the example shown in FIG. 8, the processes in steps S407 and S409 in FIG. 7 are omitted. That is, no time synchronization is performed in the operating status monitoring periods, and the measurement start time information, the communication start time information, or any other piece of information is not received.

When the clocking circuit 113 turns on the alarm output based on the measurement start time information, the measurement period labeled with A2 starts. The communication circuit 125 transmits the transmission information at the communication start time corresponding to the communication start time information acquired in A1. In the example shown in FIG. 8, the communication circuit 125 receives the reference time information, the measurement start time information, the communication start time information, and the operating status monitoring time information again in the measurement period labeled with A2. The processing circuit 121 performs the time synchronization and sets the measurement start time information and the operating status monitoring time information in the measurement period labeled with A2. Based on the measurement start time information set at this point, the time when the next measurement period starts is determined. Based on the operating status monitoring time information set at this point, the time when the operating status monitoring period before the next measurement period starts is determined. The same holds true for the subsequent procedures.

Figure 9:
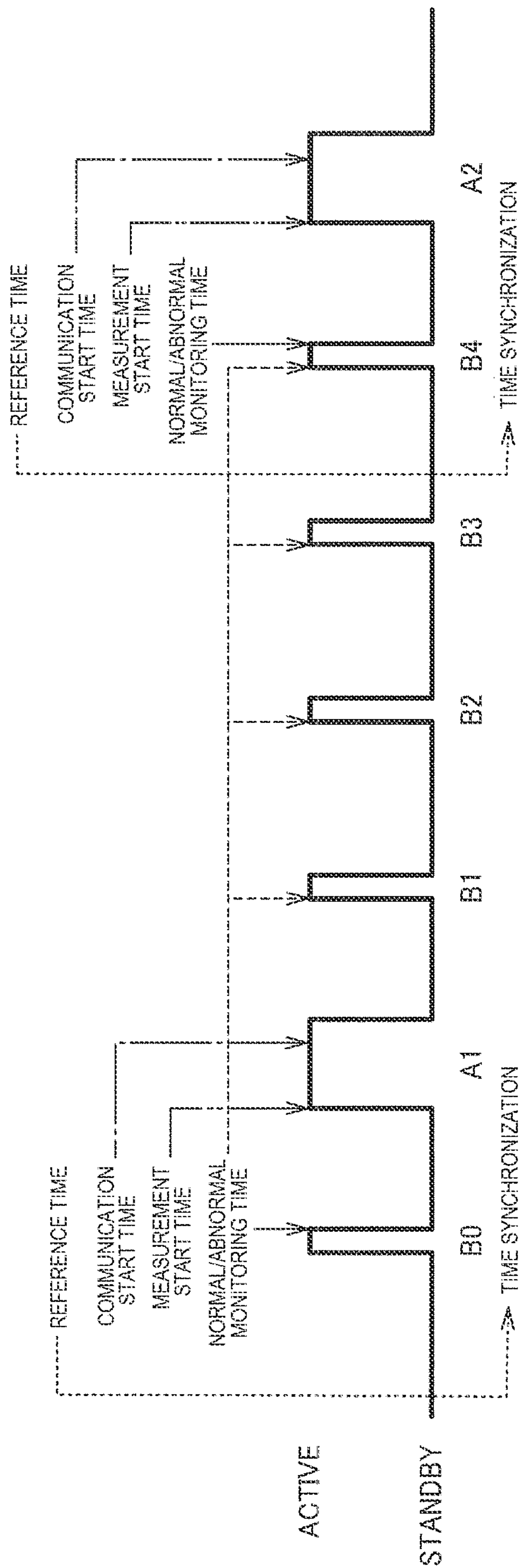
FIG. 9 is another diagram for describing the timings at which the communication start time information and other pieces of information are acquired.

The processes in the present embodiment are, however, not limited to those described above. For example, the i-th activation period may be the operating status monitoring period. FIG. 9 describes the timings at which the communication start time information and other pieces of information are set. FIG. 9 is also similar to FIG. 3, with the horizontal axis representing the time and the active period representing the activation period. A1 and A2 each represent the measurement period, and B0 to B4 each represent the operating status monitoring period.

For example, when the measurement period labeled with A1 is the j-th activation period, the i-th activation period is the operating status monitoring period labeled with B0. The processes in the operating status monitoring period are those described above with reference to FIG. 7, and the communication circuit 125 receives the reference time information, the measurement start time information, the communication start time information, and the operating status monitoring time information in the process shown in step S407 in the operating status monitoring period labeled with B0. The time synchronization in the clocking circuit 113 is then performed by using the time information, as shown in step S409. The time synchronization is thus performed in B0, which is the i-th activation period, as shown in FIG. 9. In step S409, the measurement start time information and the operating status monitoring time information are set to the clocking circuit 113.

After the operating status monitoring period labeled with B0 ends, the clocking circuit 113 turns on the alarm output based on the set measurement start time information or operating status monitoring time information. Specifically, when the clocking circuit 113 turns on the alarm output based on the measurement start time information, the measurement period labeled with A1 starts. The communication circuit 125 transmits the transmission information at the communication start time corresponding to the communication start time information acquired in B0. In the example shown in FIG. 9, the processes shown in steps S108, S210, and S310, and the processes shown in steps S110, S212, S312 are omitted. That is, no time synchronization is performed in the measurement period, and the measurement start time information, the communication start time information, or any other piece of information is not received.

When the clocking circuit 113 turns on the alarm output based on the operating status monitoring time information, the operating status monitoring periods labeled with B1 to B4 start. In the example shown in FIG. 9, the communication circuit 125 receives the reference time information, the measurement start time information, the communication start time information, and the operating status monitoring time information again in the operating status monitoring period labeled with B4. The processing circuit 121 performs the time synchronization and sets the measurement start time information and the operating status monitoring time information in the operating status monitoring period labeled with B4. Based on the measurement start time information set at this point, the time at which the next measurement period starts is determined. Based on the operating status monitoring time information set at this point, the time at which the following operating status monitoring periods each start is determined. The same holds true for the procedure that follows the operating status monitoring period.

When the communication start time information received in a given activation period is used in a later measurement period as described above, the timing at which the information from the host system 200 is received, for example, can be limited to a specific timing. For example, the communication circuit 125 is configured to be capable of receiving data from the host system 200 only for a predetermined period after transmitting data, as described above. The period for which the communication circuit 125 is turned on is thus limited to a specific period, whereby the power consumed in the communication can be reduced.

FIGS. 8 and 9 have described the case where the reference time information, the measurement start time information, the operating status monitoring time information, and the communication start time information are received and set in a single activation period. The processes in the present embodiment are, however, not limited to those described above. For example, part of the information may be received in the measurement period, and the remaining information may be received in the operating status monitoring period.

The time information in the clocking circuit 113 is corrected based on the reference time information received by the communication circuit 125, as described above. After the correction performed on the clocking circuit 113, errors accumulate in the period until the next time correction because the clocking circuit 113 measures the time based on the clock signal, for example, from the oscillator. In the approach of the present embodiment, it is desirable that the measurement start time is highly accurate in consideration of the fact that the measurement is performed in a desired period, and it is further desirable that the communication start time is highly accurate in consideration of collision avoidance and other factors. That is, it is desirable that the time information from the clocking circuit 113 is highly accurate in the measurement period, and the importance of accuracy of the time information in the operating status monitoring period is low. It is therefore desirable that the activation period in which the time synchronization is performed precedes the start of the measurement period, and that the time difference between the activation period and the measurement period is small. For example, the time synchronization is performed in an operating status monitoring start period immediately before the measurement period, as shown in FIG. 9. On the other hand, the measurement start time information and the communication start time information only need to be received before the measurement period at an arbitrary receipt timing. Similarly, the operating status monitoring information only needs to be received before the operating status monitoring period at an arbitrary receipt timing. Therefore, for example, the communication circuit 125 may receive the measurement start time information, the operating status monitoring time information, and the communication start time information in the measurement period and the reference time information in the operating status monitoring period. In addition to the above, selection of an activation period in which each of the aforementioned types of information is received can be changed in a variety of manners.

Further, the case where the communication circuit 125 receives information corresponding to one month in one receipt process has been presented. For example, in a given activation period, the communication circuit 125 receives information to be used in the next one measurement period and information to be used in the next four operating status monitoring periods. It is, however, noted that the communication circuit 125 may receive a greater amount of information in one receipt process. For example, the communication circuit 125 may receive information corresponding to M months in a given activation period. M is an integer greater than or equal to two. For example, in a given activation period, the communication circuit 125 receives information to be used in the next M measurement periods and information to be used in the next 4×M operating status monitoring periods. The numbers of times of the receipt and setting of the measurement start time information, the operating status monitoring time information, and the communication start time information can thus be reduced. It is, however, desirable that the reference time information is received at a high frequency to some extent in consideration of the error of the time information from the clocking circuit 113.

When information corresponding to M months is received, the measurement start time information may be information that specifies the measurement start time corresponding to each of M times, for example, information including M pieces of information that each specify a year, a month, a day, an hour, a minute, and a second. The measurement start time information may instead be information, such as "10 A.M. on the first day of every month". The same applies to the communication start time information. The operating status monitoring time information may be a set of pieces of information that each specify a year, a month, a day, an hour, a minute, and a second or may, for example, be "midnight every Wednesday". When "10 A.M. on the first day of every month", "midnight every Wednesday", or any other information is used, the period for which the information is used may be variable. For example, the sensing apparatuses 100 may continuously use the received information unless the host system 200 instructs a change in the measurement start time information or any other information.

In the above description, the case where the received information is used in the closest measurement period has been presented. Instead, the measurement start time information and the communication start time information received in a given activation period may not be used in the next measurement period but may be used in the measurement period next to the next measurement period or any of the following measurement periods. The same applies to the operating status monitoring time information and the communication start time information.

In addition, a variety of changes can be made to the timing at which the measurement start time information or any other information is received and the timing at which the received information is used.

2.4 Initialization Process

As described above, in the approach of the present embodiment, after the power supply circuit 111 is activated by the alarm output from the clocking circuit 113, Vdd supplied from the power supply circuit 111 causes the processing circuit 121 to start operating. The timing at which the alarm output from the clocking circuit 113 is turned on is determined, for example, by the measurement start time set by the processing circuit 121. Therefore, in the state in which the processing circuit 121 has not performed the settings, the clocking circuit 113 does not output the alarm, so that the power supply circuit 111 is not activated. Further, since the processing circuit 121 does not operate in the state in which the power supply circuit 111 is not activated, the processing circuit 121 cannot set the clocking circuit 113. As a result, the sensing apparatuses 100 cannot start operating.

Therefore, in the present embodiment, the initialization process may be carried out separately from the measurement process shown in any of FIGS. 4 to 6 and the operating status monitoring process shown in FIG. 7. The initialization process is, for example, a process carried out before a sensing apparatus 100 is installed at a target object.

Figure 10:
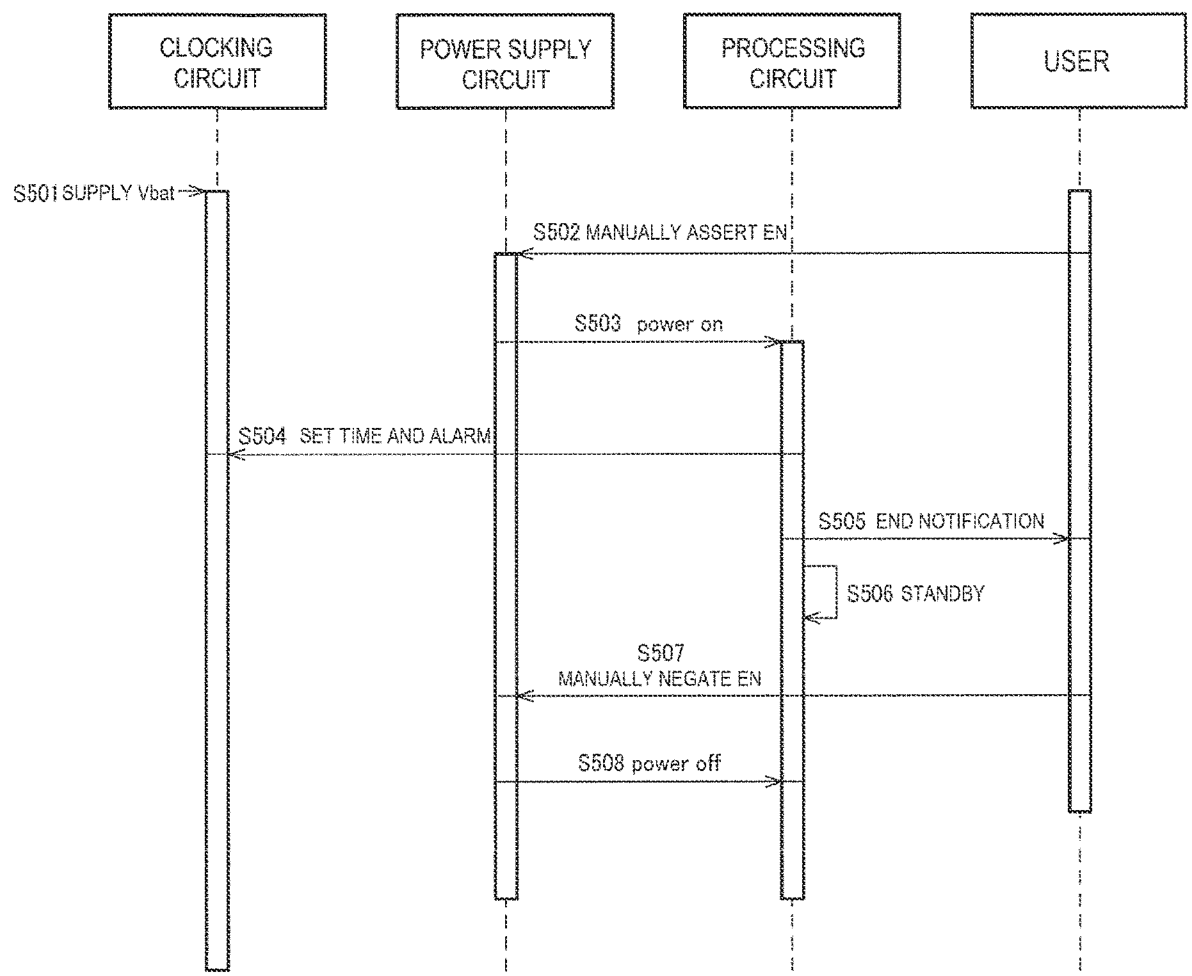
FIG. 10 describes the procedure of an initialization process.

FIG. 10 describes the procedure of the initialization process. When the initialization process starts, the battery BAT is first coupled to the sensing apparatus 100. As a result, Vbat, which is the battery voltage, is supplied to the first circuit 110 including the clocking circuit 113 in step S501.

Thereafter, in step S502, a user manually asserts the enable signal for the power supply circuit 111. The process in step S502 is carried out, for example, by using a jumper pin.

When the enable signal is asserted, the power supply circuit 111 outputs Vdd based on Vbat. Specifically, in step S503, the power supply circuit 111 turns on the processing circuit 121 by supplying the processing circuit 121 with Vdd.

In step S504, the processing circuit 121 sets the clocking circuit 113. Specifically, the processing circuit 121 corrects the time information from the clocking circuit 113 based on the reference time information. Further, the processing circuit 121 carries out the process of setting the measurement start time information and the operating status monitoring time information in the clocking circuit 113. The clocking circuit 113 can thus turn on the alarm output at the measurement start time or the operating status monitoring time. The process in step S504 is carried out, for example, by using the external information processing apparatus coupled via the interface 127 in FIG. 2. For example, the user causes the processing circuit 121 to set the clocking circuit 113 by causing the information processing apparatus, such as a PC (personal computer), to transmit a command. The command includes a command for setting the communication start time information in the sensing apparatus 100. For example, in step S504, the storage 129 stores the communication start time information inputted via the interface 127.

In step S505, the processing circuit 121 transmits to the information processing apparatus a notification stating that the setting of the clocking circuit 113 has been completed. The process in step S505 is carried out via the interface 127, as in step S504. For example, the processing circuit 121 transmits the end notification in step S505 as a response to the command inputted from the information processing apparatus. After step S505, the processing circuit 121 carries out a standby preparation process in step S506.

Having received the end notification, the user manually negates the enable signal for the power supply circuit 111 in step S507. The process in step S507 is carried out, for example, by using a jumper pin, as in step S502. When the enable signal is negated, the power supply circuit 111 stops outputting Vdd based on Vbat. Specifically, in step S508, the power supply circuit 111 turns off the processing circuit 121 by stopping supplying the processing circuit 121 with Vdd.

The measurement start time and other pieces of information are set in the clocking circuit 113 by carrying out the initialization process shown in FIG. 10. The measurement process shown in any of FIGS. 4 to 6 and the operating status monitoring process shown in FIG. 7 can thus be appropriately carried out. Further, at the end of the processes in FIG. 10, neither the power supply circuit 111 nor the processing circuit 121 is in operation, whereby the power consumption can be reduced.

The processing circuit 121 may determine the process performed when processing circuit 121 receives the supplied Vdd and starts operating, the initialization process, the measurement process, or the operating status monitoring process. For example, the storage 129 stores an initialization completion flag. For example, when the initialization completion flag is off, the processing circuit 121 carries out the process of accepting a command from the external information processing apparatus. The initialization process shown in FIG. 10 can thus be appropriately carried out. When the initialization process is carried out, the user carries out the process of turning on the initialization completion flag, for example, by using a command from the information processing apparatus. When the initialization completion flag is on, the processing circuit 121 carries out the measurement process or the operating status monitoring process. The processing circuit 121 determines the process to be carried out, the measurement process or the operating status monitoring process, by comparing the current time with the measurement start time and the operating status monitoring time. The processing circuit 121 can thus carry out an appropriate process according to the situation.

3. Application Example

Figure 11:
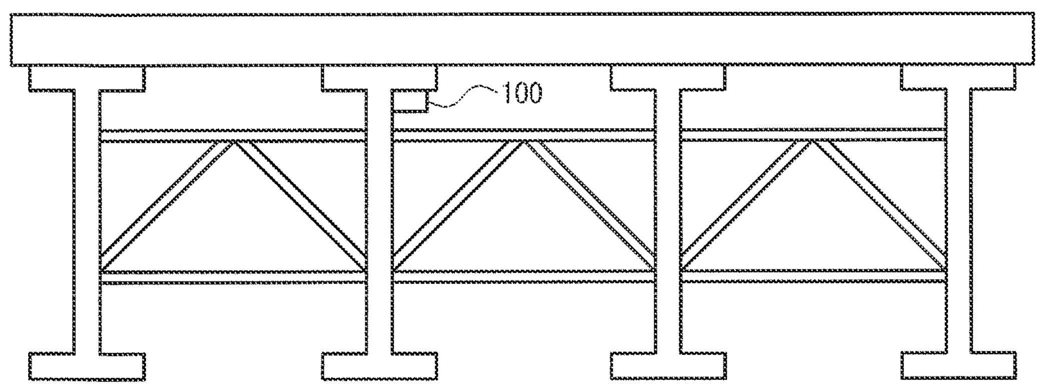
FIG. 11 shows an example of the placement of the sensing apparatus.

The sensing apparatuses 100 according to the present embodiment each detect, for example, a physical quantity representing the deformation of a structure when a moving body moves along the structure. The structure is, for example, a bridge, as shown in FIG. 11. A sensing apparatus 100 is disposed in a given position on the bridge and detects deformation of the bridge when the moving body moves on the bridge. The moving body may be a train, an automobile, or any other moving body. The structure is not limited to a bridge and can be extended to other artificial structures, such as a building, a road, a tower, a utility pole, and a dam. The structure may further include a natural structure, such as a mountain, a river, and a cliff. The moving body is not limited to an object that moves on the structure and may move in the vicinity of the structure. For example, a building constructed in the vicinity of a railroad track may be the structure according to the present embodiment, and the sensing apparatus 100 may detect vibration or displacement of the building when a train passes along the railroad track.

The sensing apparatus 100 may be used for maintenance of a machine installed, for example, in a factory. For example, the sensing apparatus 100 measures, for example, displacement that occurs when an instrument having a movable portion operates. The machine used herein may, for example, be a manufacturing apparatus used to manufacture a product or a machine for packaging or any other purpose. The machine may instead be a robot having an arm and an end effector. The target of the maintenance is not limited to a machine and may be an environment in which the machine is installed, for example, a floor or a wall surface.

The present embodiment has been described above in detail, and a person skilled in the art will readily appreciate that a large number of variations are conceivable to the extent that they do not substantially depart from the novel items and effects of the present disclosure. Such variations are all therefore assumed to fall within the scope of the present disclosure. For example, a term described at least once in the specification or the drawings along with a different term having a broader meaning or the same meaning can be replaced with the different term anywhere in the specification or the drawings. Further, all combinations of the present embodiment and the variations fall within the scope of the present disclosure. Moreover, the configuration, operation, and other factors of each of the sensing apparatuses, the sensing system, and the like are not limited to those described in the present embodiment and can be changed in a variety manners.

What is claimed is:

1. A sensing apparatus comprising:
a sensor;
a processing circuit that acquires sensor output information from the sensor;
a communication circuit that transmits transmission information corresponding to the sensor output information and receives communication start time information;
a power supply circuit that supplies the processing circuit with power supply voltage based on battery voltage from a battery; and
a clocking circuit that operates by using the battery voltage and generates time information,
wherein the power supply circuit is activated by an instruction from the clocking circuit,
the processing circuit starts acquiring the sensor output information after the power supply voltage is supplied from the activated power supply circuit, and
the communication circuit starts transmitting the transmission information corresponding to the acquired sensor output information at communication start time specified by the communication start time information.

2. The sensing apparatus according to claim 1,
wherein the processing circuit operates in a low power consumption mode until the communication start time is reached.

3. The sensing apparatus according to claim 2,
wherein the processing circuit generates the transmission information by performing given computation on the sensor output information, and
the processing circuit carries out the process of transmitting the transmission information generated by the computation after returning from the low power consumption mode.

4. The sensing apparatus according to claim 2,
wherein the processing circuit carries out the process of transmitting the sensor output information as the transmission information after returning from the low power consumption mode.

5. The sensing apparatus according to claim 2,
wherein the processing circuit causes the communication circuit to transmit the transmission information by supplying the communication circuit with the power supply voltage from the power supply circuit after returning from the low power consumption mode.

6. The sensing apparatus according to claim 1,
wherein the communication circuit receives measurement start time information, and
the clocking circuit activates the power supply circuit at measurement start time specified by the measurement start time information to supply the processing circuit with the power supply voltage.

7. The sensing apparatus according to claim 1,
wherein the communication circuit transmits the transmission information, based on the communication start time information received by the communication circuit in an i-th activation period (i is a positive integer), in a j-th activation period (j is an integer that satisfies j>i) after the i-th activation period.

8. The sensing apparatus according to claim 7,
wherein the i-th activation period is a measurement period or an operating status monitoring period.

9. A sensing system comprising:
a first sensing apparatus that is the sensing apparatus according to claim 1;
a second sensing apparatus; and
a host system,
wherein the host system transmits first communication start time information as the communication start time information to the first sensing apparatus and second communication time information to the second sensing apparatus, the second communication time information different from the first communication start time information in terms of the communication start time.

* * * * *